United States Patent
Kwilosz

(10) Patent No.: US 6,216,986 B1
(45) Date of Patent: Apr. 17, 2001

(54) CLIP WITH FLEXIBLE LOCKING ARMS

(75) Inventor: Mark J. Kwilosz, Frankfurt, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/420,261

(22) Filed: Oct. 18, 1999

(51) Int. Cl.[7] .................... F16L 3/08; F16L 3/12; F16L 3/00
(52) U.S. Cl. ............................. 248/74.1; 248/73
(58) Field of Search ................. 248/74.1, 74.2, 248/73, 65, 67.5, 316.1, 316.2, 316.3, 316.5

(56) References Cited

U.S. PATENT DOCUMENTS

| | | |
|---|---|---|
| 3,444,596 * | 5/1969 | Soltysik ................ 248/74.1 |
| 4,566,660 | 1/1986 | Anscher et al. . |
| 4,840,334 | 6/1989 | Kikuchi . |
| 4,917,340 | 4/1990 | Juemann et al. . |
| 5,184,794 * | 2/1993 | Saito ................... 248/74.1 |
| 5,263,671 | 11/1993 | Baum . |
| 5,271,587 * | 12/1993 | Schaty et al. ........ 248/74.1 |
| 5,460,342 | 10/1995 | Dore et al. . |
| 5,509,182 | 4/1996 | Nakanishi . |
| 5,510,579 * | 4/1996 | Hammer et al. ......... 248/73 |
| 5,533,696 | 7/1996 | Laughlin et al. . |
| 5,618,015 | 4/1997 | Morini . |
| 5,704,573 | 1/1998 | de Beers et al. . |
| 5,782,090 | 7/1998 | Locke . |

* cited by examiner

Primary Examiner—Ramon O. Ramirez
Assistant Examiner—J. DeLuca
(74) Attorney, Agent, or Firm—Pitney, Hardin, Kipp & Szuch LLP

(57) ABSTRACT

The clip includes two locking arms with proximal segments joining the outer periphery, distal segments forming a tube pocket, and hinge elements between the proximal segments and the distal segments. The distal segments include outwardly turned locking elements. An interior frame joined to said outer periphery includes locking pockets complementary to the locking elements. A tube pocket is formed between the distal segments of the locking arms and a portion of the interior frame. As the distal segments of the locking arms flex outwardly in response to the insertion of a tubular element, the outwardly turned locking elements are urged into the locking pockets.

12 Claims, 6 Drawing Sheets

CLIP WITH FLEXIBLE LOCKING ARMS

BACKGROUND OF THE INVENTION

1. Field of the Invention

The present invention relates to a clip with flexible locking arms for maintaining in a locked position a tubular element within a range of diameters.

2. Description of the Prior Art

The prior art includes clips for retaining a tube, such as a wire, pipe or other tubular structural element. However, such clips are frequently designed for a tube of a specific diameter or a limited range of diameters. While some clips, such as those of a snail-type design, can accommodate a range of diameters, these clips frequently do not have a locking mechanism to assure the secure engagement of the clip to the tube. Additionally, particularly with automotive applications, the clip must not only securely engage the tube but must also have little or no tendency to rattle.

Examples of prior art clips include U.S. Pat. No. 5,782,090 entitled "Hose Clip" and issued on Jul. 21, 1998 to Locke; U.S. Pat. No. 5,704,573 entitled "Aperture Held Clip Type Fastener" and issued on Jan. 6, 1998 to de Beers et al.; U.S. Pat. No. 5,618,015 entitled "Clip for Fastening Pipes and Similar Articles" and issued on Apr. 8, 1997 to Morini; and U.S. Pat. No. 5,533,696 entitled "Conduit Clip" and issued on Jul. 9, 1996 to Laughlin et al.

OBJECTS AND SUMMARY OF THE INVENTION

It is therefore an object of this invention to provide a clip which can engage a tubular structural element of a relatively wide range of diameters.

It is therefore a further object of this invention to provide a clip which can lockingly engage a tubular structural element.

It is therefore a still further object of this invention to provide a clip which can achieve the above objects while having little or no tendency to rattle.

These and other objects are attained by providing a clip with two flexible locking arms which have a relatively central hinge between a proximal segment and a distal segment. This forces the flexible locking arms against each other in response to a force otherwise tending to remove the tube thereby locking the tube into a tube pocket within the clip.

The hinge of the flexible locking arms controls where the flexible locking arms bend when the tube is forced out of the clip. The hinge is placed above the highest point of the largest diameter being used. The tube is in contact with the flexible locking arms at all times to avoid rattle.

The rigidity of the support surrounding the clip relative to flexible locking arms is chosen so that the flexible locking arms can flex while the support and other elements remain relatively rigid. The distal ends of the flexible locking arms include outwardly turned locking elements which are urged into complementary locking pockets in response to a force otherwise tending to remove the tube thereby urging the flexible locking arms toward each other.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENTS

Figure 1:
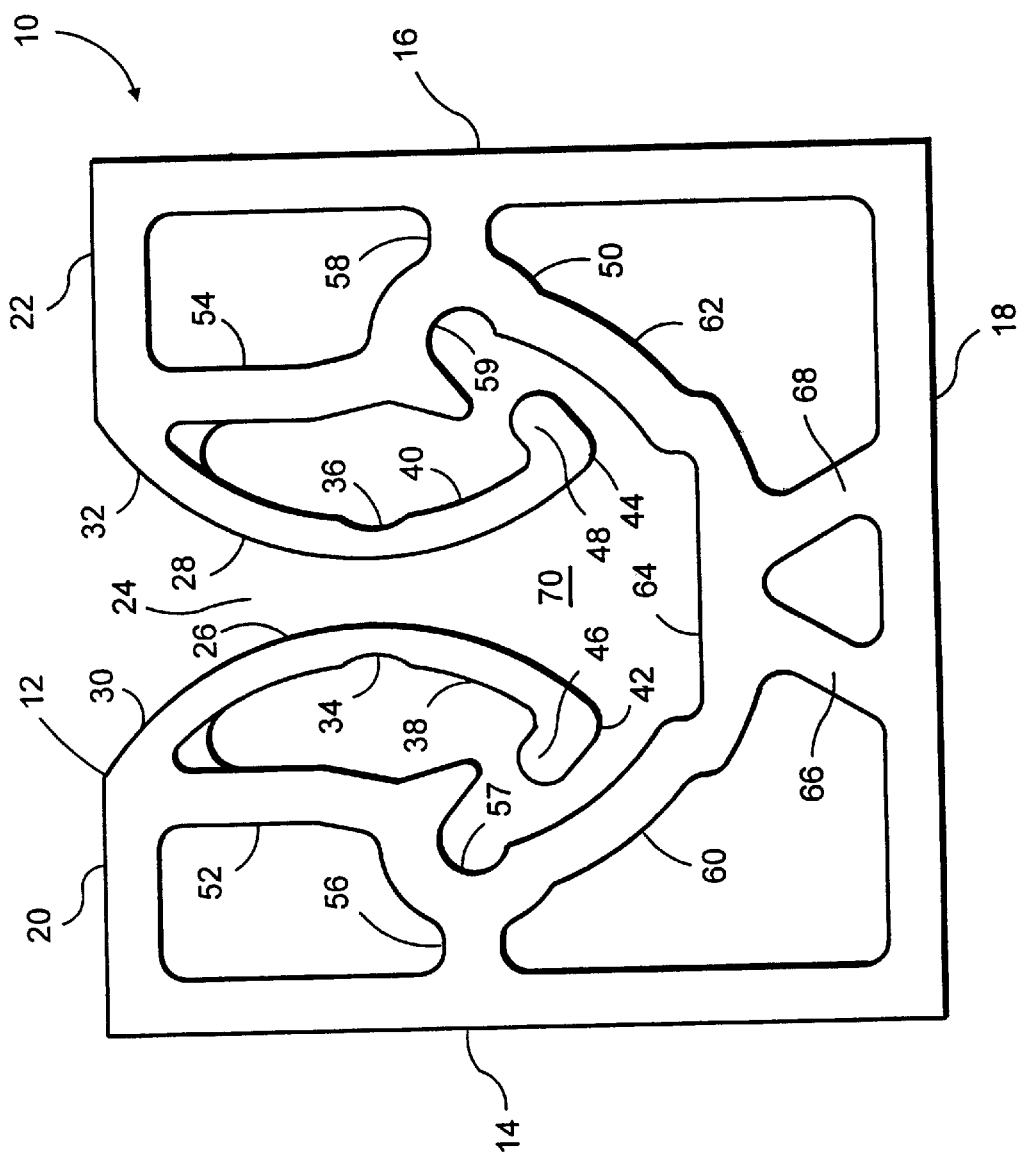
FIG. 1 is a front plan view of a single clip embodiment of the present invention.
Figure 2:
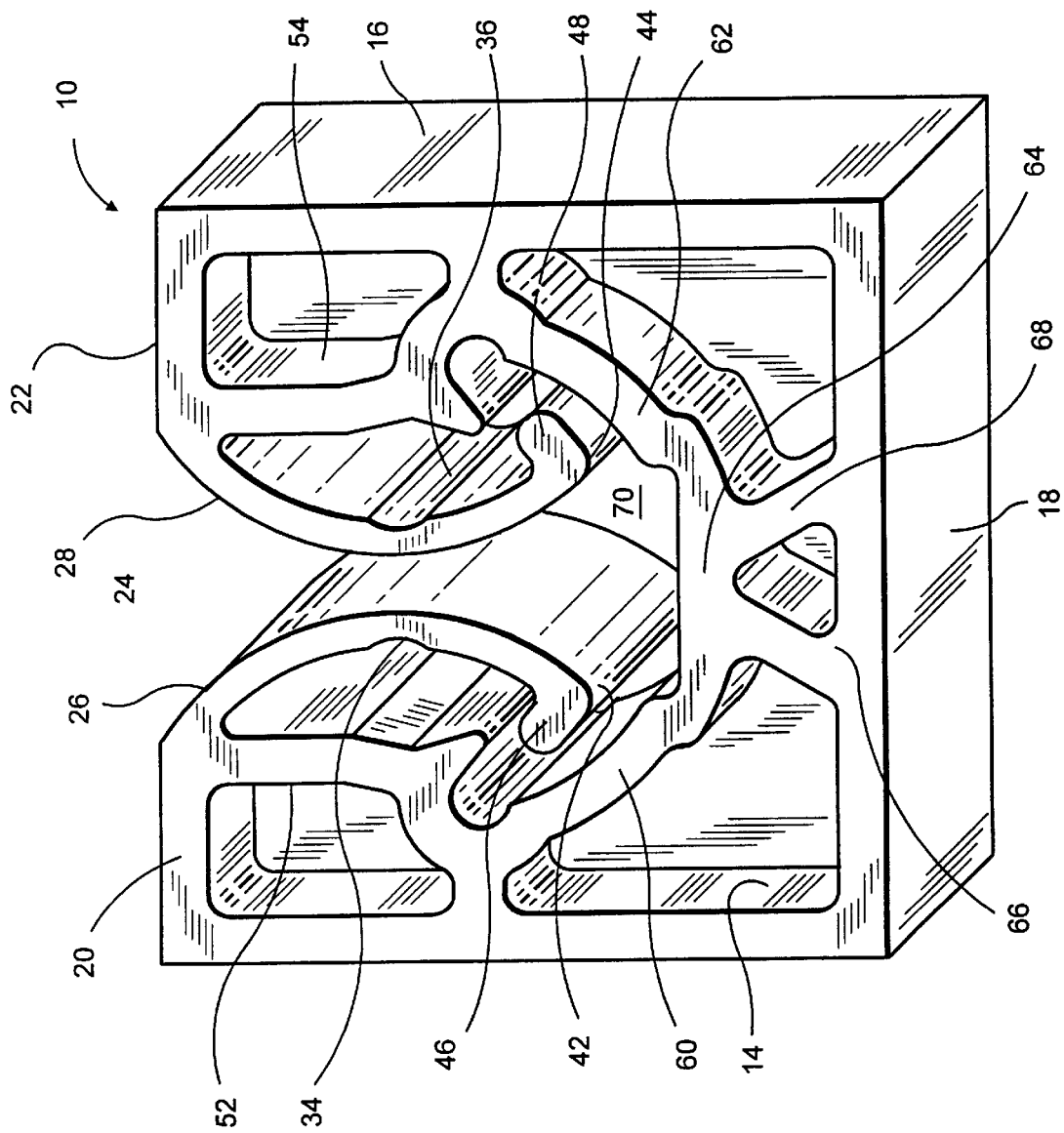
FIG. 2 is a perspective view of the single clip embodiment of the present invention.
Figure 3:
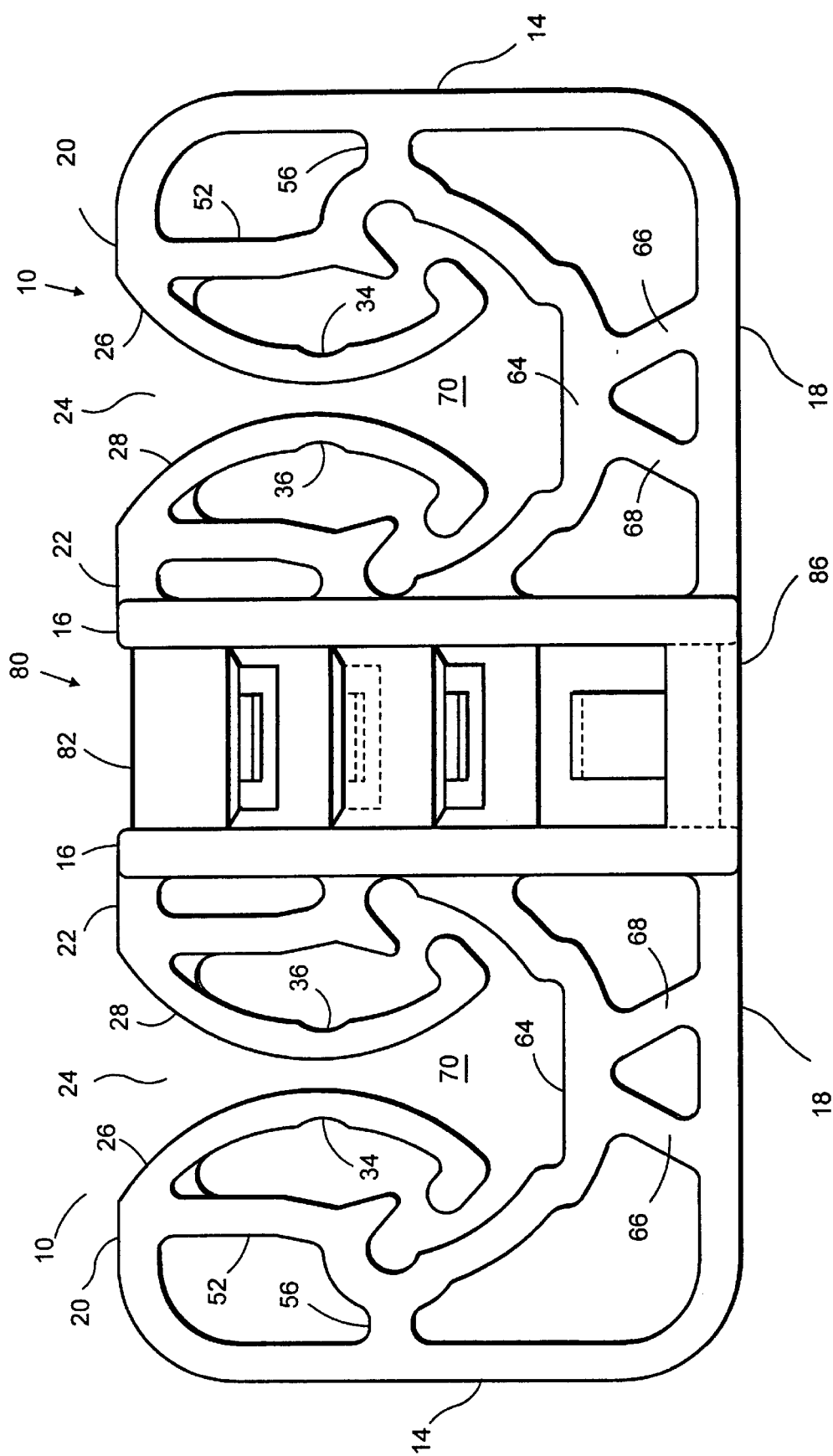
FIG. 3 is a front plan view, partially in phantom, of the double clip embodiment of the present invention.
Figure 4:
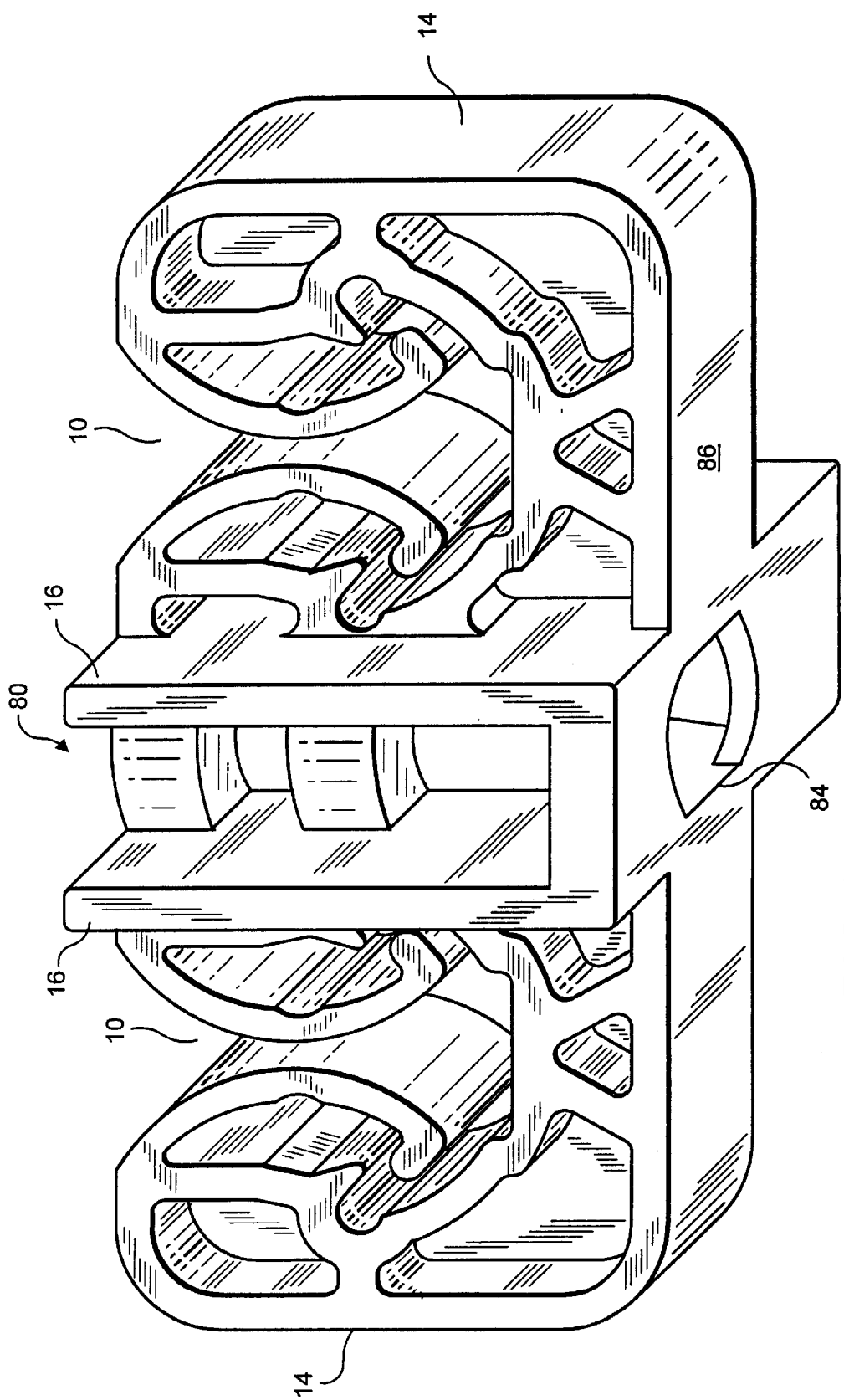
FIG. 4 is a perspective view of the double clip embodiment of the present invention.
Figure 5:
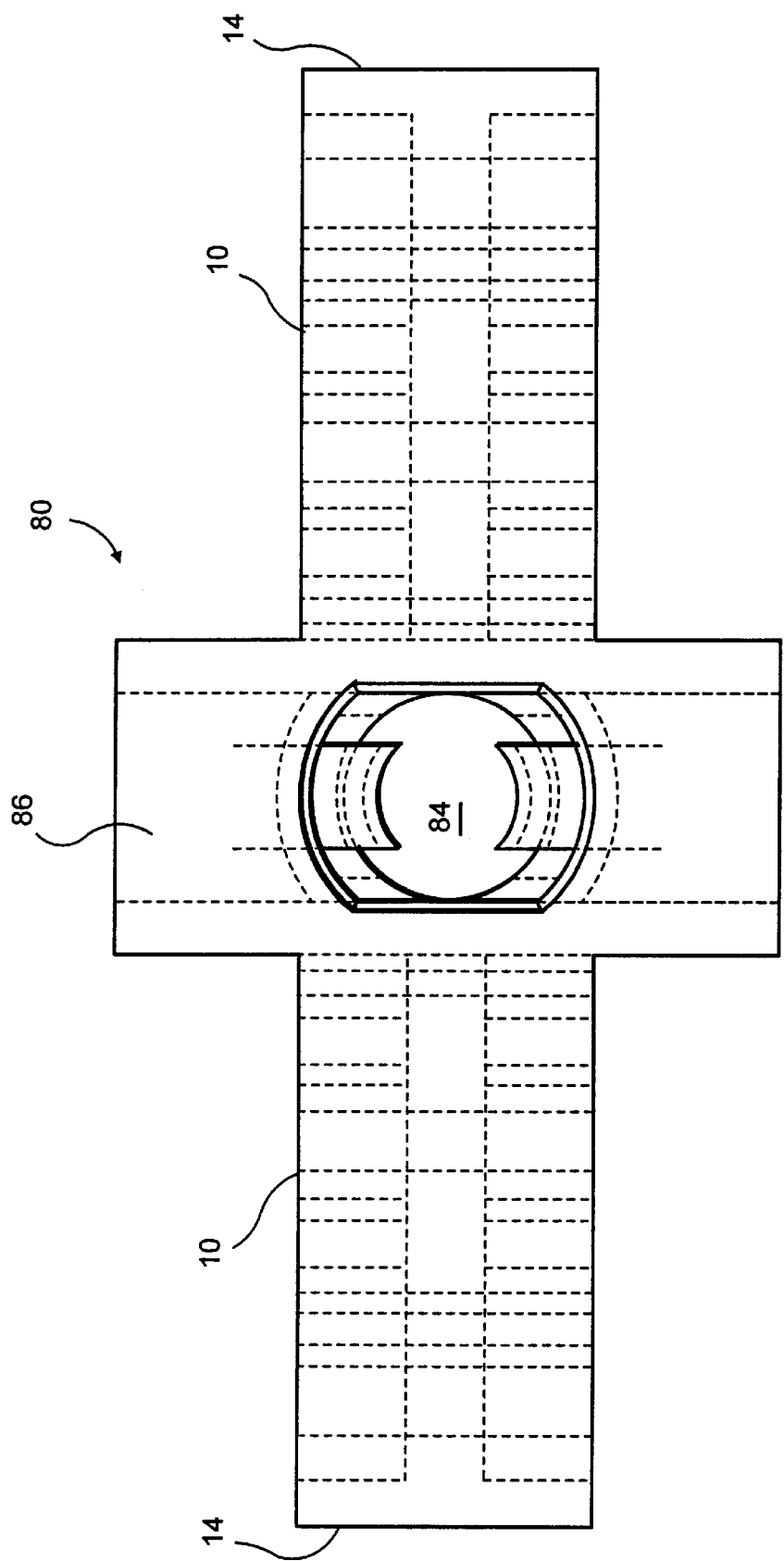
FIG. 5 is top plan view, partially in phantom, of the double clip embodiment of the present invention.
Figure 6:
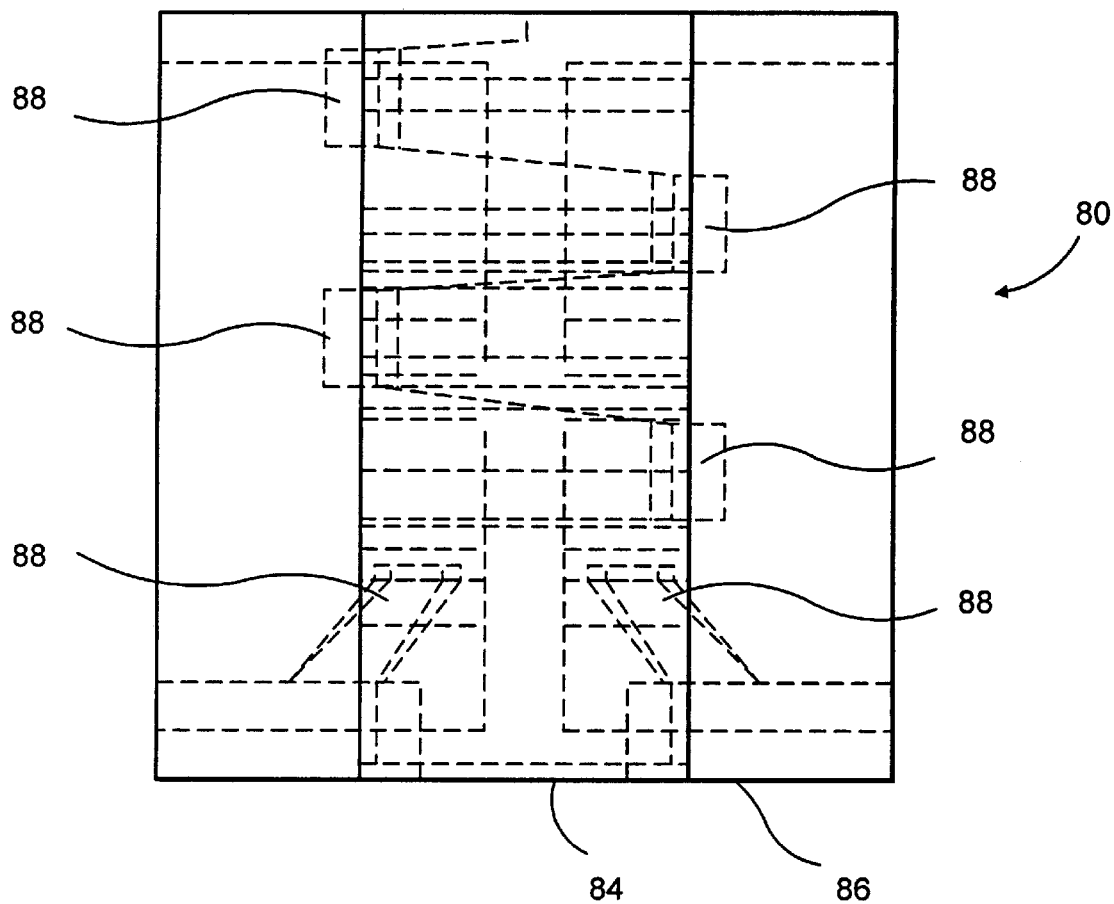
FIG. 6 is a side plan view, partially in phantom, of the double clip embodiment of the present invention.

Referring now to the drawings in detail wherein like numerals refer to like elements throughout the several views, one sees that FIG. 1 is a front plan view of single clip 10, which is typically molded as a single plastic piece. FIG. 2 is a perspective view of single clip 10. A square outline is formed by upper wall 12, sidewalls 14, 16 and lower wall 18. Upper wall 12 is formed from upper wall segments 20 and 22, at right angles to sidewalls 14, 16, respectively, with opening 24 formed between upper wall segments 20, 22.

Arcuate flexible locking arms 26, 28 have proximal ends 30, 32 which are integral with upper wall segments 20, 22. Arcuate flexible locking arms 26, 28 extend downwardly into the interior of single clip 10 and bow inwardly. Arm hinges 34, 36 are formed at a central portion of arcuate flexible locking arms 26, 28 by removing a partially circular portion from relatively outward walls 38, 40 of locking arms 26, 28. Distal ends 42, 44 of locking arms 26, 28 include outwardly turned locking segments 46, 48.

Interior frame 50 is formed by interior side walls 52, 54, interior diagonal walls 60, 62 and lower interior wall 64. Interior side walls 52, 54 extend downwardly from the intersection of upper wall segments 20, 22 and proximal ends 30, 32 of locking arms 26, 28. Interior side walls 52, 54 are roughly parallel to side walls 14, 16. Horizontal isthmuses 56, 58 extend from side walls 14, 16 to the interior sidewalls 52, 54 where locking pockets 57, 59 are formed to receive outwardly turned locking segments 46, 48 as locking arms 26, 28, particularly the distal ends 42, 44 and the portions below arm hinges 34, 36, flex outwardly. Interior diagonal walls 60, 62 extend diagonally downwardly and inwardly from horizontal isthmuses 56, 58 to lower interior wall 64. Lower interior wall 64 is supported by lower isthmuses 66, 68. Tube pocket 70 is formed within the area generally bounded by lower interior wall 64, interior diagonal walls 60, 62 and the lower portions of locking arms 26, 28.

Arm hinges 34, 36 of locking arms 26, 28 redirect a force otherwise tending to remove a tube (not shown) from tube pocket 70 whereby outwardly turned locking segments 46, 48 are urged into locking pockets 57, 59. This likewise urges the locking arms 26, 28 against each other in response to a force otherwise tending to remove the tube (not shown) from tube pocket 70. This locks the tube into tube pocket 70.

Arm hinges 34, 36 control where the locking arms 26, 28 will bend when the tube (not shown) is force out of the clip 10. The position of arm hinges 34, 36 must be above the highest point of the largest diameter tube being retained. If arm hinges 34, 36 are placed lower than the top of the tube, locking arms 26, 28 will flex away from each other, allowing the tube to be easily removed. The tube diameter range is dependent upon the circle defined by tangency to the bottom of tube pocket 70 and the locking arms 26, 28. The tube must be in contact with locking arms 26, 28 at all times to avoid rattle, so the tube cross section is the smallest circles within the parameters. The top of the largest tube possibly retained cannot be greater than the center of the arc formed by the locking arms 26, 28.

Additionally, under ordinary usage, clip 10 should flex only in locking arms 26, 28. There should ordinarily be sufficient stiffness and therefore no flexure in upper wall 12, sidewalls 14, 16, lower wall 18 and interior frame 50. There is no other interference requiring flexure integrated into clip 10 as locking arms 26, 28 would otherwise not function properly. The locking arms 26, 28 lock when a force is applied to remove the tube from the tube pocket 70. The locking arms 26, 28 are pushed into locking pockets 57, 59 thereby forcing locking arms 26, 28 toward each other. Positive locking is thereby achieved for a range of tube diameters.

Double clip 80 is disclosed in FIGS. 3, 4, 5 and 6. Two single clips 10 are formed as mirror images of each other with sidewalls 16 integral with central shaft retainer 82 and elements as otherwise described above. Central shaft retainer 82 includes longitudinal aperture 84 with an opening in lower surface 86. Longitudinal aperture 84 is partially threaded by inwardly extending elements 88 to engage a threaded bolt-type or similar structure.

In order to use single clip 10 or double clip 80, a user inserts tube (not shown) through opening 24 and past locking arms 26, 28 into tube pocket 70.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A clip for engaging a tubular element comprising:
    an outer periphery;
    an opening in said outer periphery leading to a channel;
    said channel being bounded by locking arms;
    said locking arms each including a proximal segment, a distal segment, and a hinge portion;
    said proximal segments being integral to said outer periphery proximate to said opening, said hinge portions joining said proximal segments to said distal segments, and said distal segments diverging away from each other to form a tube pocket therebetween;
    said distal segments including outwardly turned locking elements;
    locking pockets formed inwardly from said outer periphery, whereby when distal segments flex outwardly about said hinges in response to insertion of a tubular element through said channel, said outwardly turned locking elements engage said locking pockets thereby locking a tubular element into the clip.

2. The clip of claim 1 wherein said locking arms bow inwardly toward each other whereby said hinges are formed at a point of minimum distance between said locking arms.

3. The clip of claim 2 wherein said hinges are formed by a section of reduced thickness of said locking arms.

4. The clip of claim 3 further including an interior frame formed inwardly from said outer periphery.

5. The clip of claim 4 further including isthmuses which join said interior frame to said outer periphery.

6. The clip of claim 5 wherein said distal segments of said locking arms and a portion of said interior frame form said tube pocket for engaging a tubular element.

7. A clip assembly for engaging tubular elements including;
    a central post including an aperture for receiving a shaft,
    a plurality of clips formed along sides of said central post, each of clips of said plurality of clips including;
        a periphery, at least a portion of said periphery being integral with said central post;
        an opening in said periphery leading to a channel;
        said channel being bounded by locking arms;
        said locking arms each including a proximal segment, a distal segment, and a hinge portion;
        said proximal segments being integral to said periphery proximate to said opening, said hinge portions joining said proximal segments to said distal segments, and said distal segments diverging away from each other to form a tube pocket therebetween;
        said distal segments including outwardly turned locking elements;
        locking pockets formed inwardly from said periphery, whereby when distal segments flex outwardly about said hinges in response to insertion of a tubular element through said channel, said outwardly turned locking elements engage said locking pockets thereby locking a tubular element into the clip.

8. The clip assembly of claim 7 wherein said locking arms bow inwardly toward each other whereby said hinges are formed at a point of minimum distance between said locking arms.

9. The clip assembly of claim 8 wherein said hinges are formed by a section of reduced thickness of said locking arms.

10. The clip assembly of claim 9 further including an interior frame formed inwardly from said periphery.

11. The clip assembly of claim 10 further including isthmuses which join said interior frame to said periphery.

12. The clip assembly of claim 11 wherein said distal segments of said locking arms and a portion of said interior frame form said tube pocket for engaging a tubular element.

* * * * *